US008331967B2

(12) United States Patent
Iwamura et al.

(10) Patent No.: US 8,331,967 B2
(45) Date of Patent: *Dec. 11, 2012

(54) BASE STATION, MOBILE STATION, AND REDIRECTED CELL DETERMINATION METHOD

(75) Inventors: Mikio Iwamura, Yokohama (JP); Minami Ishii, Yokohama (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 214 days.

This patent is subject to a terminal disclaimer.

(21) Appl. No.: 12/377,330

(22) PCT Filed: Aug. 14, 2007

(86) PCT No.: PCT/JP2007/065864
§ 371 (c)(1),
(2), (4) Date: May 21, 2009

(87) PCT Pub. No.: WO2008/023613
PCT Pub. Date: Feb. 28, 2008

(65) Prior Publication Data
US 2010/0210218 A1    Aug. 19, 2010

(30) Foreign Application Priority Data

Aug. 22, 2006  (JP) .................................. 2006-225928

(51) Int. Cl.
*H04W 72/00* (2009.01)
(52) U.S. Cl. .................. 455/509; 455/452.2; 455/67.11; 455/561; 370/331
(58) Field of Classification Search .......... 455/405–409, 455/422.1–425, 432.1, 435.1–435.3, 436–445, 455/449–453, 485, 461, 466
See application file for complete search history.

(56) References Cited

U.S. PATENT DOCUMENTS

| 6,393,003 B1 * | 5/2002 | Lee ................................ 370/331 |
| 7,415,275 B2 | 8/2008 | Shirakabe et al. |
| 2001/0006515 A1 * | 7/2001 | Lee et al. ....................... 370/331 |
| 2005/0075125 A1 * | 4/2005 | Bada et al. ..................... 455/525 |
| 2005/0096016 A1 * | 5/2005 | Tervo et al. ................ 455/414.1 |

(Continued)

FOREIGN PATENT DOCUMENTS
CN    1703113 A    11/2005
(Continued)

OTHER PUBLICATIONS

International Search Report w/translation from PCT/JP2007/065864 dated Dec. 4, 2007 (4 pages).

(Continued)

*Primary Examiner* — Ajit Patel
*Assistant Examiner* — Erica Navar
(74) *Attorney, Agent, or Firm* — Osha Liang LLP (57) ABSTRACT

One feature of the present invention relates to a base station for operating multiple cells each having a predefined bandwidth, including: a redirected cell determination unit configured to determine, in response to receipt of mobile station capability information indicative of at least one of a bandwidth and a frequency band that a mobile station residing in a coverage area of the base station is capable of handling, at least one of a redirected cell and a cell layer for the mobile station associated with the mobile station capability information as redirected cell information for redirecting the mobile station; and a transmission unit configured to transmit the redirected cell information to the mobile station.

7 Claims, 9 Drawing Sheets

U.S. PATENT DOCUMENTS

2006/0183482 A1* 8/2006 Ueda .............................. 455/439

FOREIGN PATENT DOCUMENTS

| JP | 10-322760 A | 12/1998 |
| JP | 2003-125450 A | 4/2003 |
| JP | 2005-341432 A | 12/2005 |
| JP | 2006-222845 A | 8/2006 |
| WO | 2005/094100 A1 | 10/2005 |

OTHER PUBLICATIONS

Written Opinion from PCT/JP2007/065864 dated Dec. 4, 2007 (3 pages).
Patent Abstracts of Japan; Publication No. 2005-341432 dated Dec. 8, 2005; NTT DoCoMo Inc. (1 page).
Patent Abstracts of Japan; Publication No. 2006-222845 dated Aug. 24, 2006; NEC Corp. (1 page).
Patent Abstracts of Japan; Publication No. 10-322760 dated Dec. 4, 1998; Toshiba Corp. (1 page).
Patent Abstracts of Japan; Publication No. 2003-125450 dated Apr. 25, 2003; NTT DoCoMo Inc. (1 page).
3GPP_TR25.814, V7.0.0; "3rd Generation Partnership Project; Technical Specification Group Radio Access Network; Physical layer aspects for evolved Universal Terrestrial Radio Access (UTRA)"; Jun. 2006 (126 pages).
3GPP_TR25.813, V7.0.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects"; Jun. 2006 (39 pages).
3GPP_TS25.304, V6.9.0; "3rd Generation Partnership Project; Technical Specification Group Radio Access Network; User Equipment (UE) procedures in idle mode and procedures for cell reselection in connected mode"; Mar. 2006 (38 pages).
3GPP_TS25.331; V6.10.0; "3rd Generation Partnership Project; Technical Specification Group Radio Access Network; Radio Resource Control (RRC); Protocol Specification"; Jun. 2006 (1226 pages).
Laiho, J. et al.; "Radio Network Planning and Optimisation for UMTS"; John Wiley & Sons, Chicheter; pp. 229-231; 2002 (2 pages).
3GPP_TSG_RAN_WG2 #52, R2-060934; "Load Sharing using Cell Reselection"; Mar. 27-31, 2006 (4 pages).
Chinese Office Action for Application No. 200780030669.3, mailed on Jul. 26, 2011 (13 pages).
esp@cenet Patent Abstract for Chinese Patent No. 1703113, publication date Nov. 30, 2005. (1 page).

* cited by examiner

UE capability IE

> Number of bands
>> Band indicator 1
>> Band indicator 2
>> ...
> 10 MHz / 20 MHz capability ( 0 = 10 MHz / 1 = 20 MHz )

BASE STATION, MOBILE STATION, AND REDIRECTED CELL DETERMINATION METHOD

TECHNICAL FIELD

The present invention generally relates to LTE (Long Term Evolution) systems and more particularly relates to base stations, mobile stations and redirected cell determination methods.

BACKGROUND ART

As a next generation mobile communication system, a LTE (Long Term Evolution) system, which is a mobile communication system enabling data transmissions at 100 Mbps, has been intensively researched and developed.

Figure 1:
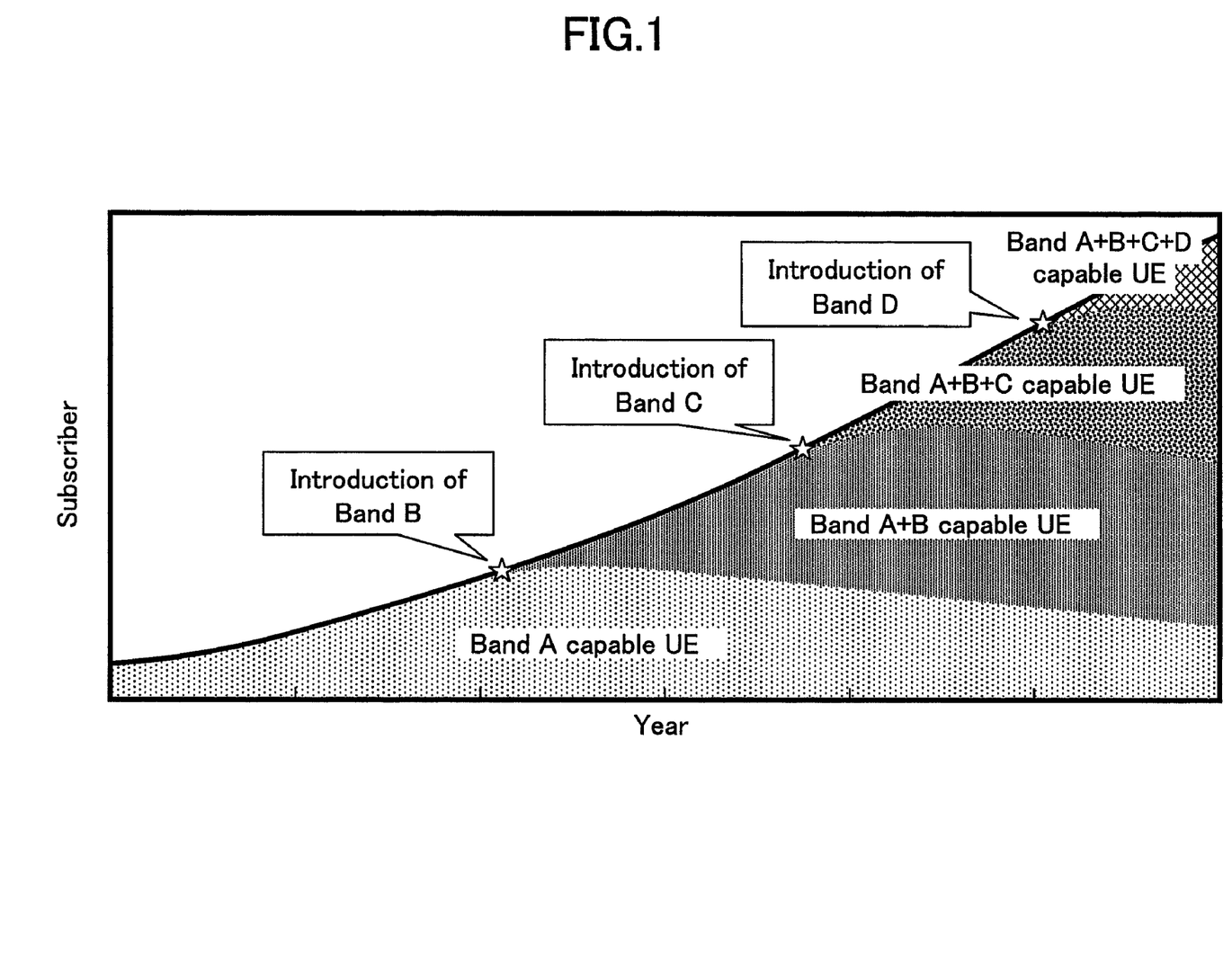
FIG. 1 is a schematic diagram illustrating increasing bands for use in a LTE system.

Such a LTE system may be initially operated with a smaller number of carriers, as illustrated in FIG. 1. For example, the LTE system is initially operated with Band A. If the frequency band becomes insufficient after a few years, license for new Band B may be obtained, or another band used for a currently operated 3 G system may be reassigned to the LTE system, so that the LTE system can be operated with Bands A and B. In addition, it is expected that the LTE system may be operated with Bands C and D in future. The term "band" used herein means a frequency band, such as 800 MHz band or 2 GHz band, where the LTE system is operated. Also, the term "carrier" used herein means a bandwidth for a system operated in a frequency band, and the demand may be that the carrier can correspond to any of 1.25 MHz, 2.5 MHz, 5 MHz, 10 MHz, 15 MHz and 20 MHz in the LTE system.

In this situation, there may initially exist only mobile stations or user equipment (UE) capable of transmission and reception in Band A (hereinafter referred to as "Band A capable UEs"), but mobile stations capable of transmission and reception in Bands A and B (hereinafter referred to as "Band A+B capable UEs") may be additionally provided after a few years. Even if Band B were newly introduced, the Band A capable UEs would not be able to use Band B for transmission and reception.

In the future, mobile stations capable of transmission and reception in Bands A, B, C and D (hereinafter referred to as "Band A+B+C+D capable UEs") may be additionally introduced. Thus, the same operator's network may be operated with multiple bands and multiple carriers, and different types of mobile stations with different transmission and reception capability may coexist.

If it comes to this situation, load balancing that can handle different transmission and reception capabilities of mobile stations may be required. For example, in a system operated with several bands and/or carriers, if mobile stations are concentrated in a certain carrier, the carrier may be intensively used for transmission and reception despite other bands and/or carriers being not fully used, resulting in degraded communication quality.

For the load balancing, there may be two types of load balancing schemes, traffic load balancing and camp load balancing. In the traffic load balancing, active users, that is, presently communicating users, may be uniformly distributed. In the camp load balancing, idle users, that is, users waiting for call, may be uniformly distributed.

For example, an article written by J. Laiho, A. Wacker and T. Novosad "Radio Network Planning and Optimisation for UMTS" (John Wiley & Sons, Chichester, 2002, p. 229-231) describes UMTS-GSM load balancing in conjunction with UMTS cell design.

Also, an article "Load sharing using cell reselection" (T-Mobile, R2-060934, TSG-RAN WG2 #52, Athens, Mar. 27-31, 2006) describes LTE-UMTS load balancing particularly for cases of where multiple operators share a network.

However, the load balancing has not been discussed from the viewpoint of separation between the traffic load balancing and the camp load balancing.

DISCLOSURE OF INVENTION

Problem to be Solved by the Invention

The LTE has some problem that appropriate cells cannot be selected if all factors of transmission and reception capability of mobile stations, an operated bandwidth of cells and load status for the cells are not taken into account. Also in the case where a network serves to select redirected cells in the load balancing, if the network does not comprehend the transmission and reception capability of mobile stations, such an appropriate cell may not be selected as the redirected cell.

Therefore, the present invention is intended to overcome the above-mentioned problems. One object of the present invention is to provide a base station, a mobile station and a redirected cell determination method that can perform appropriate load balancing depending on capability of mobile stations.

Means for Solving the Problem

In order to overcome the above problems, one feature of the present invention relates to a base station for operating multiple cells each having a predefined bandwidth, including: a redirected cell determination unit configured to determine, in response to receipt of mobile station capability information indicative of at least one of a bandwidth and a frequency band that a mobile station residing in a coverage area of the base station is capable of handling, at least one of a redirected cell and a cell layer to which the mobile station associated with the mobile station capability information is to be redirected, the mobile station capability information being redirected cell information for redirecting the mobile station; and a transmission unit configured to transmit the redirected cell information to the mobile station.

According to this configuration, it is possible to determine either a redirected cell or a cell layer to which a mobile station is to be redirected based on the mobile station capability information associated with the mobile station indicative of at least one of a bandwidth and a frequency band that the mobile station is capable of handling.

Another feature of the present invention relates to a mobile station, including: a control plane processing unit configured to determine either a redirected cell or a cell layer to which the mobile station is to be redirected based on mobile station capability information associated with the mobile station and connect to either the redirected cell transmitted by a base station or a cell selected from the cell layer, the mobile station capability information being indicative of at least one of a bandwidth and a frequency band that the mobile station residing in a coverage area of the base station is capable of handling.

According to this configuration, it is possible to connect either the redirected cell or the cell layer transmitted by the base station.

Another feature of the present invention relates to a method of determining a redirected cell, including: obtaining mobile station capability information at a base station configured to operate multiple cells each having a predefined bandwidth, the mobile station capability information being indicative of at least one of a bandwidth and a frequency band that a mobile station residing in a coverage area of the base station is capable of handling; determining at the base station either a redirected cell or a cell layer to which the mobile station associated with the mobile station capability information is to be redirected; and transmitting either the redirected cell or the cell layer from the base station to the mobile station.

According to this configuration, it is possible to determine either the redirected cell or the cell layer to which the mobile station associated with the mobile station capability information is to be redirected based on the mobile station capability information.

Advantage of the Invention

According to the embodiments of the present invention, it is possible to realize a base station, a mobile station and a redirected cell determination method that can perform appropriate load balancing depending on capabilities of mobile stations.

LIST OF REFERENCE SYMBOLS

100: base station
102: transmission and reception unit
104: dominant cell processing unit
106, 111, 118, 202: RF circuit
108, 112, 120: user plane processing unit
110, 114, 122: load measurement unit
116, 124: subordinate cell processing unit
126: redirected cell determination unit
128, 204: control plane processing unit
130: network interface
206: UE capability storage unit

BEST MODE FOR CARRYING OUT THE INVENTION

The best mode for carrying out the present invention is described with reference to the drawings in conjunction with embodiments as presented below.

Throughout all the drawings for illustrating the embodiments, the same reference symbols may be used for objects with the same function, and the objects may not be repeatedly described.

A mobile communication system including a base station and a mobile station according to one embodiment of the present invention is described with reference to FIG. 2.

In this embodiment, the mobile communication system includes a base station or eNode B (eNB) and a mobile station or user equipment (UE).

In the base station, an operator may operate several carriers, such as a 20 MHz carrier, a 10 MHz carrier and a 5 MHz carrier, in one or more bands. For example, a licensed frequency band may be operated in a LTE system. As mentioned above, the term "band" used herein means a frequency band for operating the LTE system and may be 800 MHz band or 2 GHz band, for example. Also, the term "carrier" means a bandwidth for a system operated in a frequency band, and the demand in the LTE system may be that the carrier can correspond to any of 1.25 MHz, 2.5 MHz, 5 MHz, 10 MHz, 15 MHz and 20 MHz. In other words, either of 1.25 MHz, 2.5 MHz, 5 MHz, 10 MHz, MHz or 20 MHz may be selected as the bandwidth of one carrier.

Figure 2:
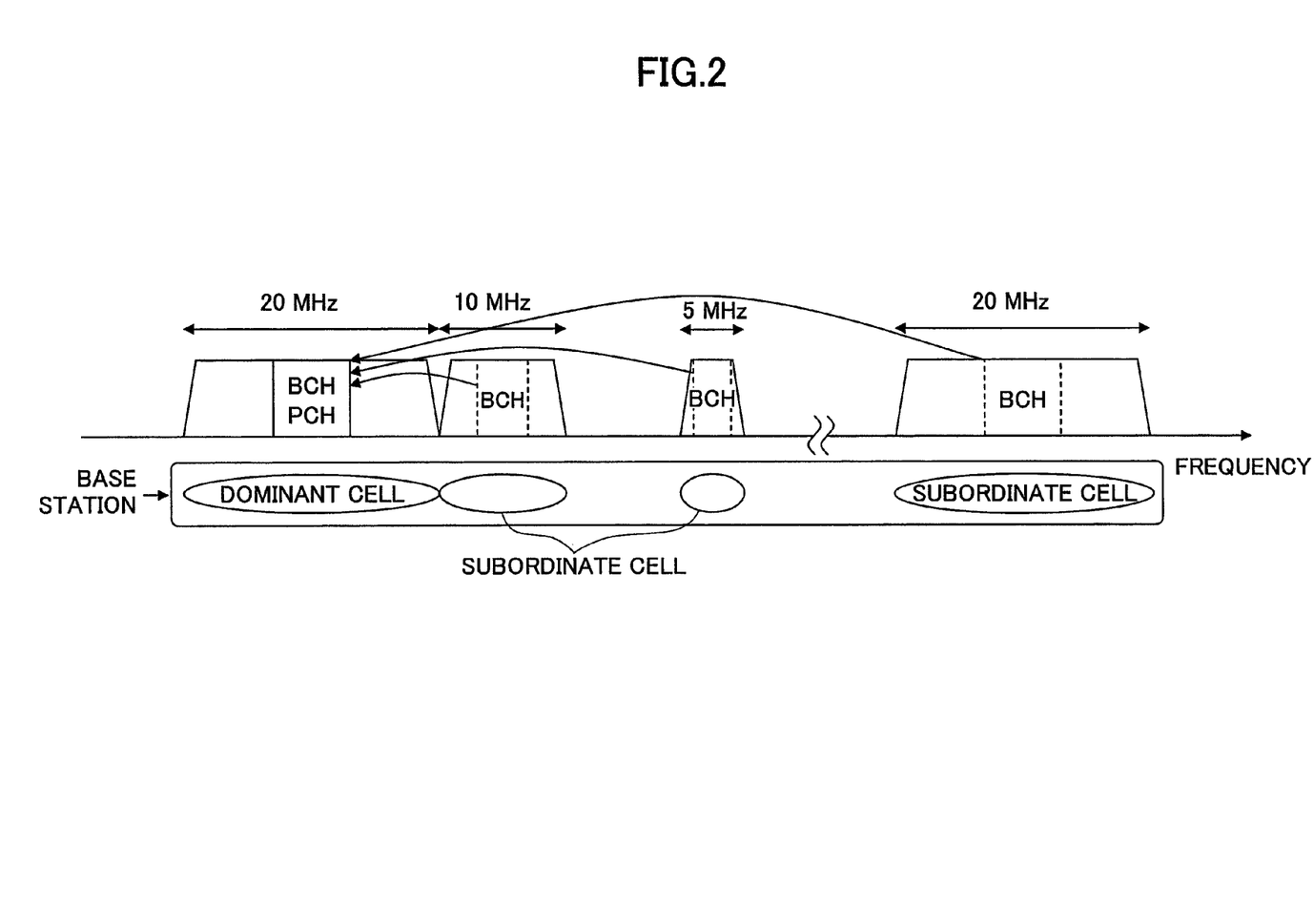
FIG. 2 is a schematic diagram illustrating an exemplary type of cell.

FIG. 2 illustrates one example where several carriers are operated in one band. In this example, two 20 MHz carriers, a 10 MHz carrier and a 5 MHz carrier are operated in one band. The carriers may be called cells.

In a certain carrier of the carriers operated in the band, for example, in only one 20 MHz carrier, a broadcast channel (BCH) for transmitting broadcast information and a paging channel for transmitting paging signals are transmitted. In the other carriers, the broadcast channel is transmitted without transmission of the paging channel, and only minimum information is transmitted in the broadcast channel. Such minimum information may include system frame number, dynamic persistence level for random access control and associated dominant cell carrier frequency code being information indicative of position of a carrier for transmitting the broadcast channel and the paging channel.

As mentioned above, the two types of carriers are provided for transmitting both the broadcast channel and the paging channel and for transmitting the minimum information in the broadcast channel without transmission of the paging channel. The two types of carriers (cells) are referred to as a dominant cell and a subordinate cell, respectively. In other words, the dominant cell allows a mobile station to not only wait in idle periods but also communicate in active periods and can transmit a synchronization channel, the broadcast channel, the paging channel and other channels. On the other hand, the subordinate cell does not allow a mobile station to wait in the idle periods but allows the mobile station to communicate in the active periods and can transmit the synchronization channel and the broadcast channel.

Also, a pair of cells included in the same band (frequency band) operated by the same base station are referred to as a cell set. The cell set includes at least one dominant cell. Also, the cell set may include one or more subordinate cells.

Figure 3:
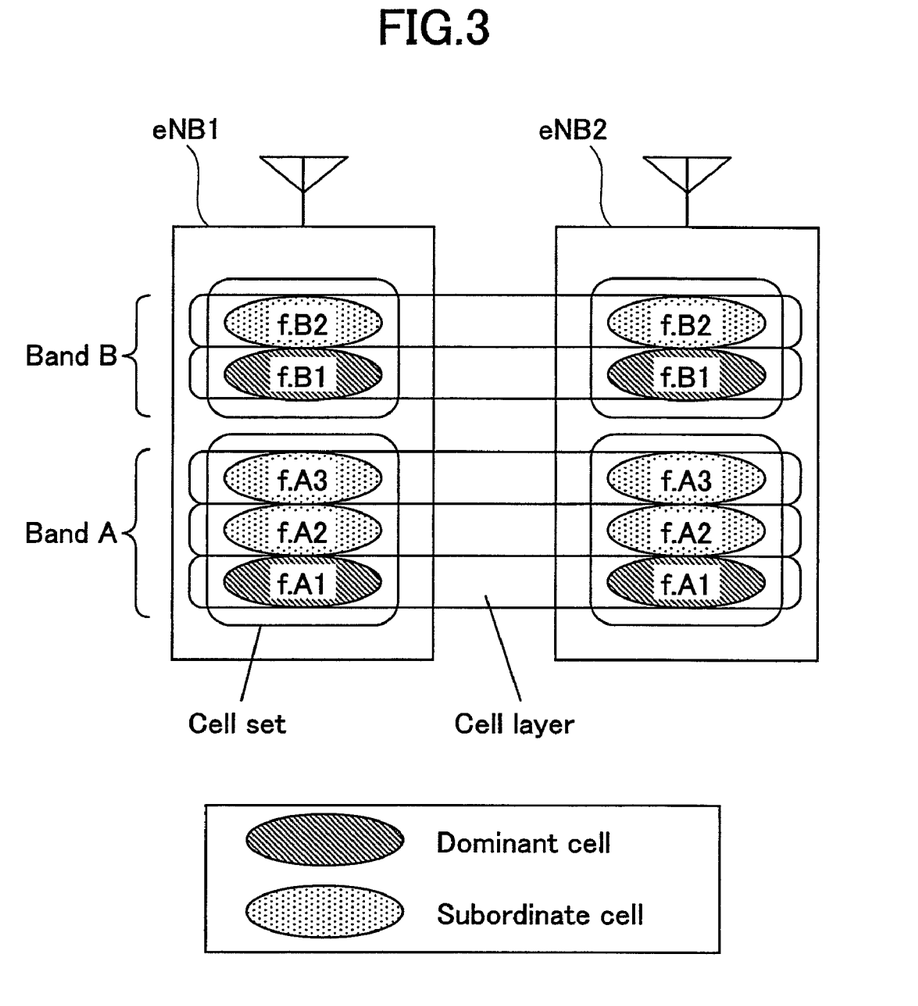
FIG. 3 is a schematic diagram illustrating cells, cell sets and cell layers.

For example, as illustrated in FIG. 3, one base station (eNB1) is provided, and Band A and Band B are operated in the base station. Three carriers (cells) fA1, fA2 and fA3 are operated in Band A, and two carriers fB1 and fB2 are operated in Band B. For example, the carriers fA1, fA2, fA3, fB1 and fB2 may be 10 MHz. Alternatively, the carriers fA1, fA2, fA3, fB1 and fB2 may be 5 MHz or 20 MHz.

In FIG. 3, the carriers fA1 and fB1 are dominant cells. On the other hand, the carriers fA2, fA3 and fB2 are subordinate cells. Cells in the same Band A, that is, a set of the carriers fA1, fA2 and fA3, constitute one cell set, and cells in the same Band B, that is, a set of the carriers fB1 and fB2, constitute another cell set.

Also, the same operation is carried out in at least one base station, such as eNB2, provided at a location different from the base station eNB1, and if the dominant cells, the subordinate cells and the cell sets are defined in that base station, a set of cells in the same carrier are referred to as a cell layer. In other words, the cell layer includes cells having the same central frequency and bandwidth.

In FIG. 3, fA1, fA2, fA3, fB1 and fB2 operated in eNB1 are paired to fA1, fA2, fA3, fB1 and fB2 operated in eNB2, respectively, and the resulting pairs are referred to as cell layers.

In a base station including multiple sectors, a dominant cell, a subordinate cell and a cell set are defined within the sectors. For example, if a base station includes three sectors each of which has one dominant cell and three subordinate cells, the base station would have 12 cells in total. Also in this case, the cell layer represents cells including the same central frequency and the same bandwidth. Thus, the cell layer may include multiple sectors and/or cells for multiple base stations. Particularly if cells having the same central frequency and the same bandwidth across a network are operated with multiple sectors by multiple base stations, these cells may be collectively referred to as a cell layer.

Traffic load balancing between the dominant cell and the subordinate cell may be critical. In the mobile communication system according to this embodiment, some interaction is performed in a control plane to establish a RRC connection in transition of a mobile station from idle state to active state. In this interaction in the control plane, the mobile station is redirected to another carrier as needed.

An exemplary operation of the mobile communication system according to this embodiment is described with reference to FIG. 4. This embodiment is described for the base station 100 that operates one dominant cell and one subordinate cell, but the present invention can be also applied to other situations where the base station 100 operates several dominants and subordinates.

Also in this embodiment, a dominant cell where the mobile station 200 is waiting for call is referred to as awaiting cell or a camped cell, and a cell to which the mobile station 200 is to be redirected is referred to as a redirected cell. This redirected cell may be a dominant cell or a subordinate cell. In some embodiments, the base station 100 may select the waiting cell as the redirected cell, but in this embodiment, the waiting cell is different from the redirected cell. In other embodiments, the base station 100 may specify a cell layer to which the mobile station 200 is to be redirected. In the embodiments, the mobile station 200 may select a cell from the specified cell layer.

An exemplary operation for an incoming call is described.

At step S402, data transmitted from a core network is buffered in an access gateway (aGW) serving as an upper station. If this access gateway is represented as a logical node, it may be called MME/UPE where the MME means a logical node for a control plane (C-Plane) and the UPE means a logical node for a user plane (U-Plane).

The MME calls the mobile station 200. Since the MME holds location registration information and knows which base stations are to be subjected to paging, at step S404, the MME transmits a paging signal to these base stations.

In the base station 100, the waiting cell pages the mobile station 200 based on the paging signal transmitted from the MME/UPE. For example, the waiting cell may transmit a paging indicator channel at step S406, and transmit a paging channel at step S408. The paging channel may include information indicative of a redirected cell as well as other information such as "cause ID" indicative of communication types and IMSI/TMSI (International Mobile Subscriber Identifier/Temporary Mobile Subscriber Identifier).

Upon receiving the paging channel, the mobile station 200 determines whether the paging channel includes the global ID of the mobile station 200, that is, whether the IMSI/TMSI is included in the paging channel, and if so, at step S410, the mobile station 200 accesses the waiting cell over a random access channel (RACH). For example, the RACH may include a signature, a CQI (Channel Quality Indicator), purpose and other information.

At step S412, the waiting cell transmits a response to the RACH (RACH response) to the mobile station 200. For example, the RACH response may include a signature, a TA (Timing Advance), c-RNTI (Cell specific-Radio Network Temporary ID) and UL grant information.

A connection request is transmitted in an uplink based on the RACH response. In LTE, it is conceived that a shared channel may be used also in the uplink for scheduling. The base station 100 specifies a time frame, a frequency block and an information amount as the UL grant. The frequency block may be referred to as a resource block or in uplinks as a resource unit. Since a SC-FDMA (Single Carrier-Frequency Division Multiple Access) scheme is applied in the uplinks, resource units consisting of a predefined one of several subcarriers are provided, and a resource unit to be used is specified from the resource units.

The C-RNTI is an ID used in RAN to identify a mobile station.

The TA is described. The UL grant specifies a time frame and a frequency block transmitted in an uplink shared channel, but since propagation delay is different depending on location of mobile stations within a cell, transmission at the same timing may cause reception timing differences at the base station 100, which may result in overlap between time frames on the time axis. In order to accommodate reception timings within a predefined time frame, transmission timing must be adjusted. Information for adjusting the transmission timing is called the TA.

At step S414, the mobile station 200 transmits a connection request (Conn. request) to the waiting cell. This connection request may include UE capability of the mobile station 200 such as information indicative of a frequency band, for example, information indicating whether the mobile station 200 can handle only Band A or both Bands A and B. In addition, the connection request may include as the UE capability information indicative of a bandwidth allowed the mobile station 200 to perform transmission and reception, for example, information indicating whether the mobile station 200 can handle 10 MHz or 20 MHz. For example, as illustrated in FIG. 5, capability information elements of the mobile station 200 may include the number of bands, that is, the number of frequency bands, a band indicator, that is, information indicative of each frequency band, and a bandwidth where the mobile station is allowed for transmission and reception, for example, information indicative of 10 MHz or 20 MHz.

At step S416, the waiting cell transmits the Conn. request to the MME/UPE.

At step S418, the base station 100 selects a cell to which the mobile station 200 is to be redirected (redirected cell) based on the UE capability transmitted from the mobile station 200. The base station 100 determines whether to redirect the mobile station 200 to another cell layer. For example, the base station 100 may determine whether to redirect the mobile station 200 to one of several cells operated by the base station 100 based on the UE capability and traffic status of each of the cells.

If the base station 100 determines to redirect the mobile station 200 to the cell, at step S420, the base station 100 transmits a connection setup redirection to the mobile station 200. This connection setup redirection may include the C-RNTI, the IMSI/TMSI, a redirection cell, a synchronization indicator, a C-RNTI in the redirected cell (new C-RNTI) and the UL grant for the redirected cell.

There is a high likelihood that synchronization may be obtained between the waiting cell and the redirected cell because of the waiting cell and the redirected cell being controlled under the same base station 100. If the waiting cell is synchronized with the redirected cell, the mobile station 200 can perform uplink transmission to the redirected cell. On the other hand, simultaneous uplink transmission may lead to reception failure at the redirected cell in environments where different propagation paths are used for different frequencies, that is, synchronization failure. For example, this situation may correspond to a base station with different antenna locations depending on used frequencies, for example, a base station with a stretching structure. The synchronization indicator may include information as to whether the synchronization can be obtained between the waiting cell and the redirected cell.

On the other hand, if the base station 100 determines that the mobile station 200 is not to be redirected to other cells, at step S420, the base station 100 transmits a connection setup redirection to the mobile station 200. This connection setup redirection may include the C-RNTI and the IMSI/TMSI but does not include the redirection cell, the synchronization indicator, the C-RNTI in the redirected cell (new C-RNTI) and the UL grant for the redirected cell.

The case where the waiting cell can be synchronized with the redirected cell is described with reference to FIG. 4.

At step S420, the mobile station 200 receives a connection setup redirection. This connection setup redirection may include the C-RNTI, the IMSI/TMSI, the redirection cell, the synchronization indicator, the C-RNTI in the redirected cell (new C-RNTI) and the UL grant for the redirected cell. Also, the synchronization indicator may include information indicative of synchronization.

When the mobile station 200 is informed that the mobile station 200 is to be redirected, at step S422, the mobile station 200 switches the presently used frequency and transmits a connection setup complete indicative of connection completion to the redirected cell.

At step S424, a NAS (Non-Access Stratum) process is performed. The NAS process is a control sequence exchanged between an upper node and a mobile station, and encryption parameters may be set in the NAS process, for example.

Next, the case where the waiting cell cannot be synchronized with the redirected cell is described with reference to FIG. 6.

Figure 6:
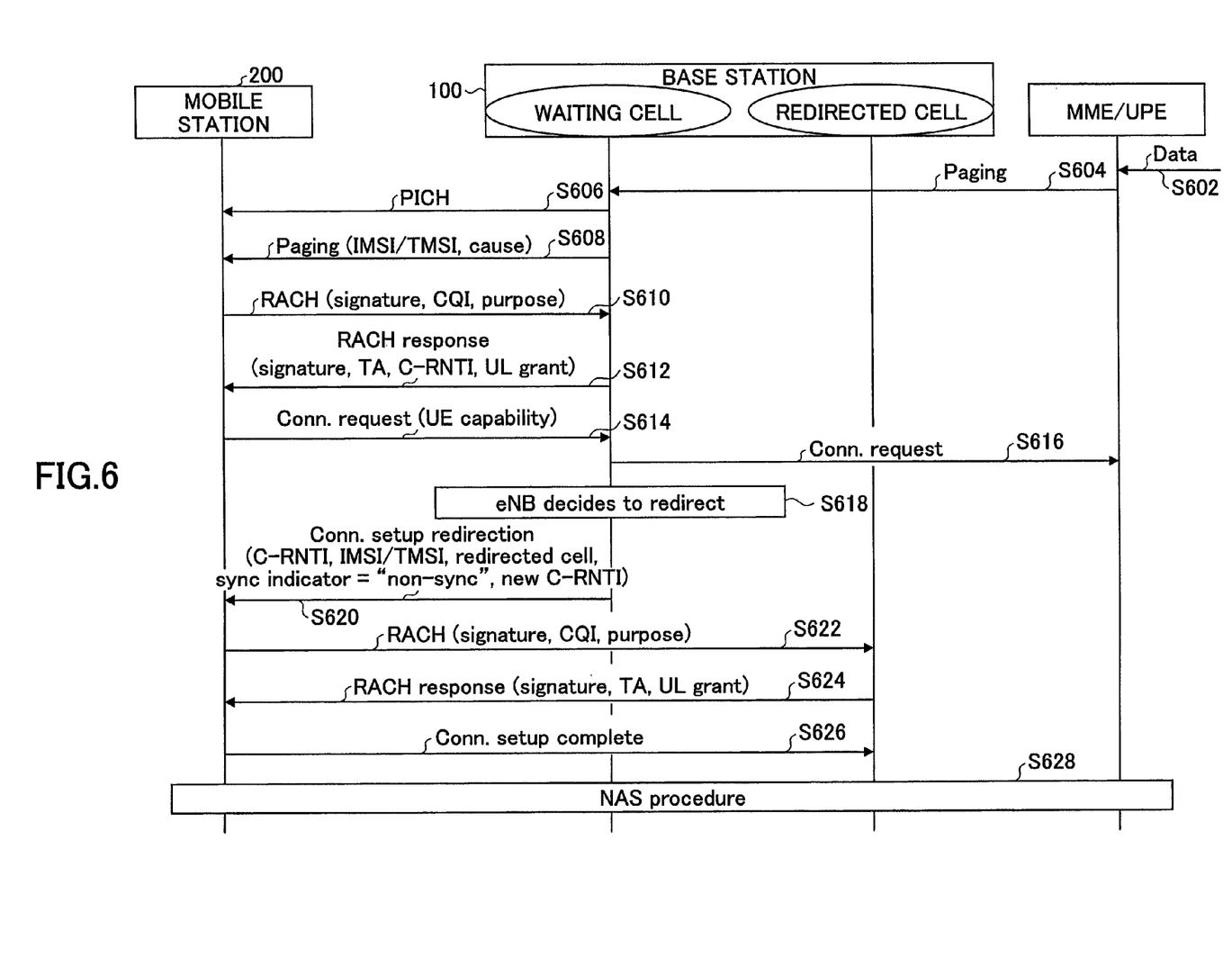
FIG. 6 is a flow diagram illustrating an exemplary operation of a mobile communication system according to one embodiment of the present invention.

In FIG. 6, steps S602-S618 are the same as steps S402-S418 described with reference to FIG. 4 and the descriptions thereof are not repeated.

At step S620, the mobile station 200 receives the connection setup redirection. This connection setup redirection may include the C-RNTI, the IMSI/TMSI, the redirection cell, the synchronization indicator, the C-RNTI in the redirected cell (new C-RNTI) and the UL grant for the redirected cell. Also, the synchronization indicator may include information indicative of asynchronization.

When the mobile station 200 is informed that the mobile station 200 is to be redirected, at step S622, the mobile station 200 switches the presently used frequency and accesses the redirected cell over a RACH. The RACH may include a signature, a CQI (Channel Quality Indicator) and purpose.

At step S624, the redirected cell transmits a response to the RACH (RACH response) to the mobile station 200. The RACH response may include the signature, the TA and the UL grant.

At step S626, the mobile station 200 transmits a connection setup complete to the redirected cell.

At step S628, the NAS procedure is performed.

Among the above-mentioned steps, steps S420-S424 and S620-S628 are simply illustrative and can be modified as needed except that the mobile station 200 transmits information indicative of the UE capability together with the connection request and that the redirected cell is determined in the waiting cell based on the transmitted information indicative of the UE capability in steps S414 and S614.

An exemplary operation for an outgoing call is described.

In this case, some operations after the above-mentioned step S410 are performed.

Figure 4:
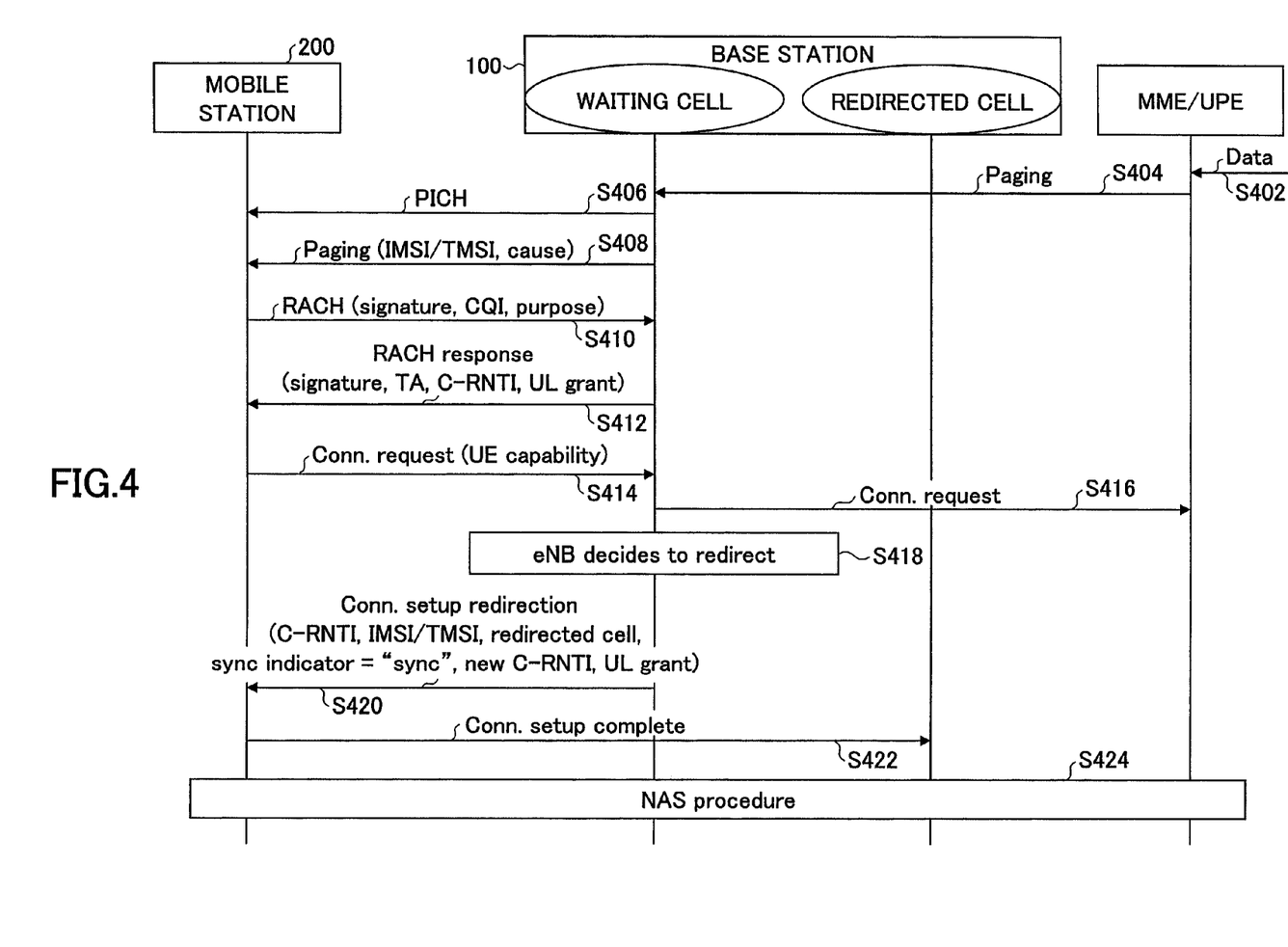
FIG. 4 is a flow diagram illustrating an exemplary operation of a mobile communication system according to one embodiment of the present invention.
Figure 5:
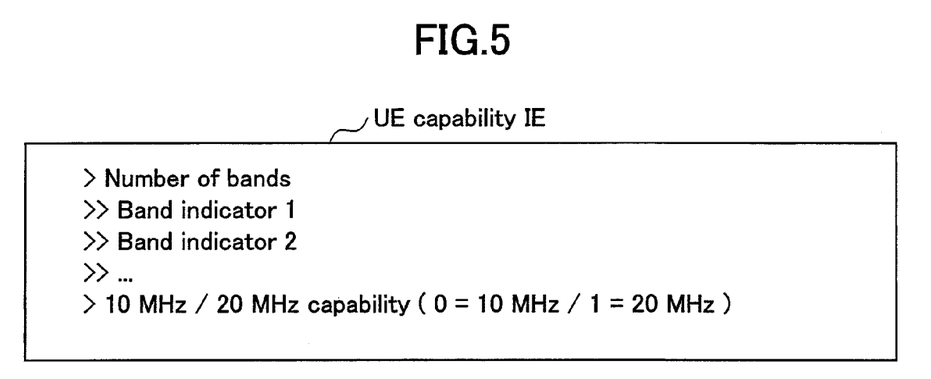
FIG. 5 is a schematic diagram illustrating exemplary capability of a mobile station transmitted by the mobile station according to one embodiment of the present invention.

Also, in step S414 in FIG. 4 and step S614 in FIG. 6, instead of transmission of the UE capability from the mobile station 200 to the waiting cell, the UE capability may be stored in the MME/UPE, and in downlink paging, a paging channel together with the UE capability may be transmitted to the base station 100. Upon being powered ON, the mobile station 200 activates a procedure called an attach. In this attach procedure, the capacity of the mobile station 200 may be stored in the MME/UPE.

Also in this embodiment, the connection request is transmitted to the MME/UPE at steps S416 and S616. In other embodiments, the capability of the mobile station 200 may be transmitted as a response to this connection request from the MME/UPE to the waiting cell.

In this manner, it is possible to reduce the number of bits of the connection request transmitted from the mobile station 200.

Figure 7:
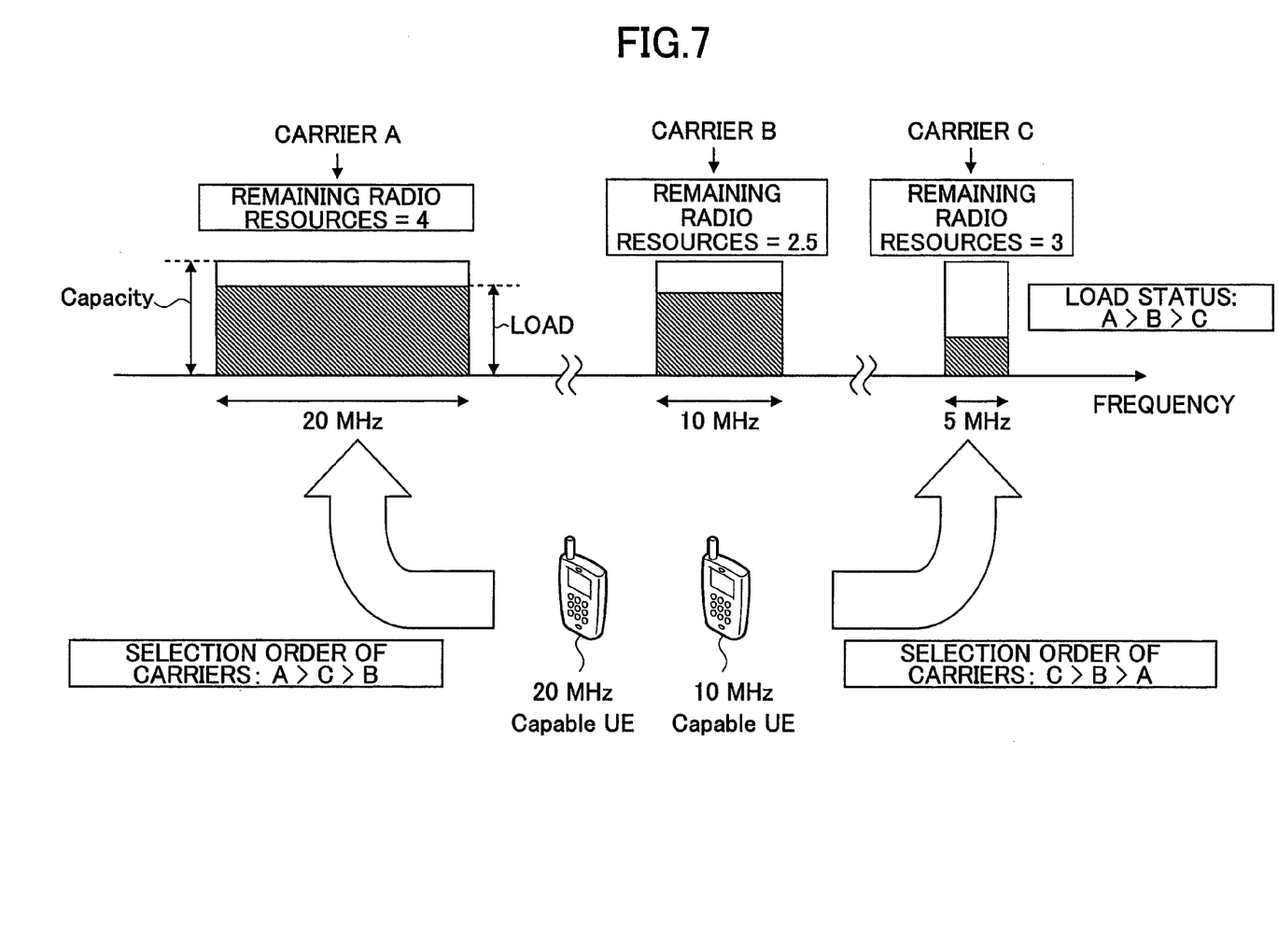
FIG. 7 is a schematic diagram illustrating an exemplary redirected cell selection method according to one embodiment of the present invention.

An exemplary method of determining a redirected cell in the base station 100 is described with reference to FIG. 7.

For example, it is assumed that carriers (cells) A, B and C are operated in a certain band and the bandwidths of cells A, B and C are 20 MHz, 10 MHz and 5 MHz, respectively. Ratios of remaining radio resources are assumed as cell A:cell B:cell C=4:2.5:3 and load status is assumed as A>B>C.

An exemplary method of determining a redirected cell in the base station 100 under this situation is described.

In the LTE, minimum transmission and reception capability of a mobile station is set to be 10 MHz. In the LTE, it is required that a system be applicable to bandwidths of 1.25 MHz, 2.5 MHz, 5 MHz, 10 MHz, 15 MHz and 20 MHz as the cell bandwidths as stated above. For example, if an operator is licensed for 20 MHz, the system is operated with the bandwidth of 20 MHz.

In this case, the mobile stations with the transmission and reception capability of 10 MHz can communicate without problems in cells operated in frequency bands less than or equal to 10 MHz, that is, in cells operated in frequency bands of 1.25 MHz, 2.5 MHz, 5 MHz and 10 MHz. However, these mobile stations would communicate in a cell operated in bandwidth of 20 MHz by using a portion of the frequency band of 20 MHz.

As a result, the mobile stations with the transmission and reception capability of 20 MHz may be the best to select the carrier A. Although the carrier A is most congested, that is, the load status is the highest in the carrier A, four units of the remaining radio resources are available in the carrier A. Thus, assignment of the mobile stations to the carrier A could improve throughput most largely. Then, the carrier C has the second largest amount of the remaining radio resources, and thus the carrier C may be next selected. Finally, the carrier B may be selected.

On the other hand, for mobile stations with the transmission and reception capability of 10 MHz, if the carrier A is selected, the remaining radio resources would be equal to 4 units. Since the carrier A is operated in the bandwidth of 20 MHz, only a half of the bandwidth can be used, and only 2 units of the remaining radio resources may be actually used. In this case, thus, it may be the best to select the carrier C. Then, since the carrier B has the second largest amount of the remaining radio resources, the carrier B may be next selected. Finally, the carrier A may be selected.

Also, for the mobile stations with the transmission and reception capability of 10 MHz, the remaining radio resources of the carriers A, B and C are determined at 2:2.5:3, and the carrier C has the largest amount of the remaining radio resource; the carrier B has the second largest amount of the remaining radio resource; and the carrier A has the smallest amount of the remaining radio resource. As a result, the carrier C may be selected. However, the carrier C has the bandwidth of 5 MHz, and the carrier B with the bandwidth of 10 MHz may happen to be congested and then the load of the carrier B may be reduced some time later. Thus, if difference of the remaining radio resources between the carriers is less than or equal to a predefined threshold, a carrier with a wider bandwidth may be assigned. In the above-mentioned case, since the difference of the remaining radio resources between the carriers C and B is relatively small (3–2.5), the carrier B may be selected.

As mentioned above, a different cell may be selected under the same load status depending on the transmission and reception capability of a mobile station (10 MHz or 20 MHz).

Figure 8:
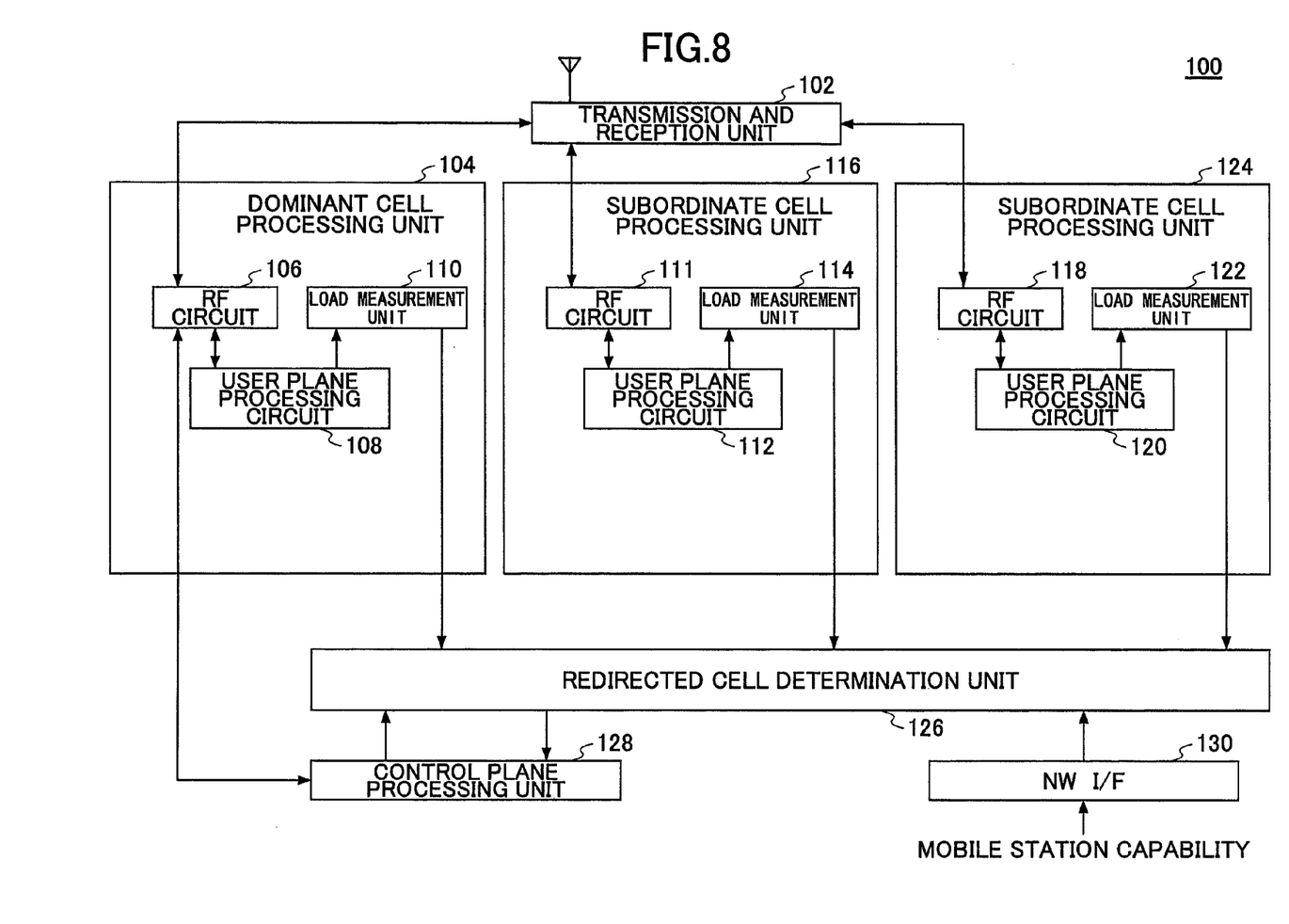
FIG. 8 is a partial block diagram illustrating a base station according to one embodiment of the present invention.

Next, an exemplary specific configuration of the base station 100 according to this embodiment is described with reference to FIG. 8.

This embodiment is described for the base station 100 that operates cells fA1, fA2 and fA3 in Band A, but the present invention can be applied to a base station that operates several bands or a base station that operates several cells (carriers) in each band. In the present embodiment, the cell fA1 is referred to as a dominant cell, and the cells fA2 and fA3 are referred to as subordinate cells.

The base station 100 includes a transmission and reception unit 102 with an antenna, a dominant cell processing unit 104, subordinate cell processing units 116, 124, a redirected cell determination unit 126, a control plane processing unit 128, and a network interface 130. In the dominant cell processing unit 104 and the subordinate cell processing units 116, 124, carriers with the central frequency fA1, fA2 and fA3, respectively, are operated.

The dominant cell processing unit 104 includes a RF circuit 106, a user plane processing unit 108 and a load measurement unit 110.

The subordinate cell processing units 116, 124 include RF circuits 111, 118, user plane processing units 112, 120 and load measurement units 114, 122, respectively.

The dominant cell processing unit 104 performs some operations on a waiting cell where the mobile station 200 is waiting for call. Also, the dominant cell processing unit 104 performs some operations on a redirected cell determined based on capability of the mobile station 200.

The subordinate cell processing units 116, 124 perform some operations on the redirected cell determined based on the capability of the mobile station 200.

The user plane processing units 108, 112 and 120 instruct the load measurement units 110, 114 and 122, respectively, to measure load at a predefined interval.

In response to the instructions from the user plane processing units 108, 112 and 120, the load measurement units 110, 114 and 122 measure the load, for example, traffic, and supply the results (load status) to the redirected cell determination unit 126.

On the other hand, a connection request including information indicative of the UE capability transmitted from the mobile station 200 is received at the RF circuit 106 via the transmission and reception unit 102 and is supplied to the control plane processing unit 128. The control plane processing unit 128 extracts the information indicative of the UE capability from the supplied connection request and supplies it to the redirected cell determination unit 126.

The redirected cell determination unit 126 uses the above-mentioned method to determine based on the load status supplied from the load measurement units 110, 114 and 122 and the UE capability transmitted from the mobile station 200 whether to cause the mobile station 200 to be redirected. If so, the redirected cell determination unit 126 determines a redirected cell and supplies it to the control plane processing unit 128. Otherwise, the redirected cell determination unit 126 does nothing.

Alternatively, the redirected cell determination unit 126 may select cells predefined corresponding to services. For example, in reception of MBMS (Multimedia Broadcast/Multicast Service), a cell to which the MEMS is transmitted or other cells belonging to a band including the cell to which the MEMS is transmitted is selected as a redirected cell. For example, if the waiting cell is serving in fA1 and the MBMS is serving in fB2, the redirected cell determination unit 126 receives the MBMS. In addition, if the redirected cell determination unit 126 selects fA2 and fA3 to use a unicast service concurrently, it would be difficult to receive the MEMS in fB2. Thus, the redirected cell determination unit 126 may select fB1 or use the unicast service within the MEMS carrier in fB2.

Also, for example, users of VoIP (Voice over Internet Protocol) may be assigned to the same band/carrier. In the VoIP, small delay is required, and the VoIP has a feature of a low transmission rate. For these users, the same band/carrier may be selected for improved radio efficiency.

Also, for example, flexible services, that is, services available even if some delay occurs, such as a Web browsing service and a file downloading service, and inflexible services such as the VoIP and a streaming service may be balanced in all carriers for assignment.

Also, a cell with better coverage may be selected for a premium user. For example, for a cell operated in 2 GHz band and a cell operated in 800 MHz band, the cell operated in 800 MHz may generally have better propagation conditions. Thus, the cell operated in 800 MHz band may be selected for the premium users as the predefined cell.

Alternatively, the redirected cell determination unit 126 may select the redirected cell based on traffic load. For example, the redirected cell may be selected based on the amount of the remaining resources and transmission power as mentioned above. Alternatively, for example, the redirected cell may be selected based on traffic load for each type of service as mentioned above.

Alternatively, the redirected cell determination unit 126 may select the redirected cell based on traveling speed of the mobile station 200. For example, for fast moving mobile stations, a cell belonging to a smaller number of cells and having a greater cell radius and broader coverage may be determined as the redirected cell. On the other hand, for slower moving mobile stations, a cell belonging to a larger number of cells and having a smaller cell radius may be determined as the redirected cell.

The control plane processing unit 128 generates and transmits a connection setup redirection based on information for specifying the redirected cell supplied from the redirected cell determination unit 126. This connection setup redirection may include the C-RNTI, the IMSI/TMSI, the redirection cell, the synchronization indicator, the C-RNTI in the redirected cell (new C-RNTI) and the UL grant for the redirected cell.

Also, as mentioned above, if the UE capability is stored in the MME/UPE, the UE capability is supplied to the redirected cell determination unit 126 via the network interface 130.

Figure 9:
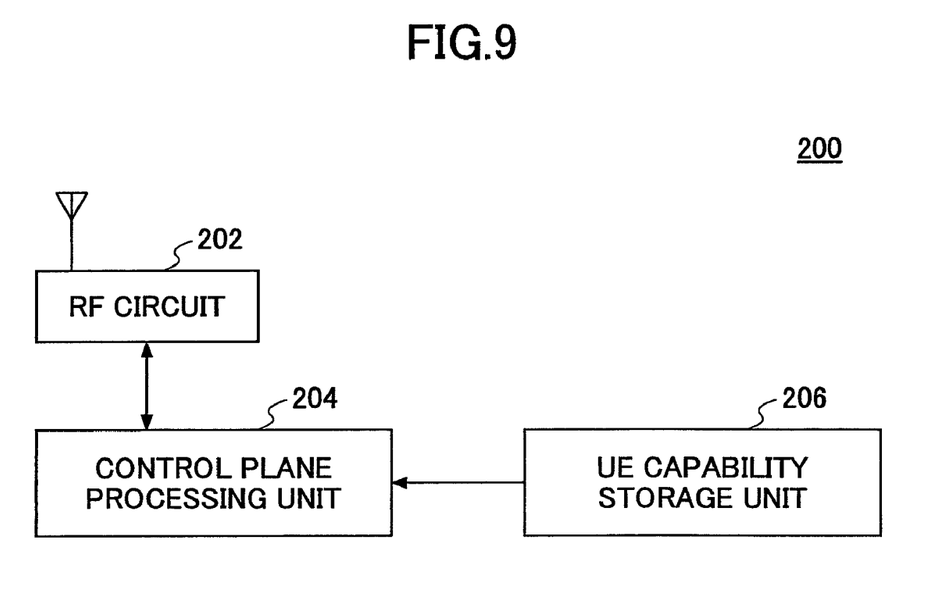
FIG. 9 is a partial block diagram illustrating a mobile station according to one embodiment of the present invention.

Next, an exemplary specific configuration of the mobile station 200 according to this embodiment is described with reference to FIG. 9.

The mobile station 200 includes a RF circuit 202, a control plane processing unit 204, and a UE capability storage unit 206.

The control plane processing unit 204 includes information indicative of the UE capability of the mobile station 200 stored in the UE capability storage unit 206 in a connection request and transmits it.

Also, the control plane processing unit 204 determines based on information in a connection setup redirection whether the mobile station 200 is requested to be redirected to another cell, and if so, the control plane processing unit 204 transmits a connection setup complete notification to the redirected cell based on the new C-RNTI and the UL grant.

According to this embodiment, the mobile station 200 can connect to the redirected cell determined in the base station 100 based on the UE capability of the mobile station 200, and thus it is possible to reduce the load for adjacent cell measurement by the mobile station 200 in the waiting period in load balancing.

For convenience, the present invention has been described with reference to the distinct embodiments, but separation of the embodiments is not essential to the present invention and two or more of the embodiments may be used together as needed. Some specific numerals have been used to facilitate understanding of the present invention, but unless otherwise noted, these numerals are simply illustrative and any other appropriate values may be used.

The present invention has been described with reference to the specific embodiments of the present invention, but the embodiments are simply illustrative and variations, modifications, alterations and substitutions could be contrived by those skilled in the art. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2006-225928 filed on Aug. 22, 2006, the entire contents of which are hereby incorporated by reference.

INDUSTRIAL APPLICABILITY

A base station, a mobile station and a redirected cell determination method according to the present invention can be applied to a radio communication system.

The invention claimed is:

1. A base station for operating multiple cells each having a predefined bandwidth, comprising:
a redirected cell determination unit configured to determine, in response to receipt of mobile station capability information indicative of at least one of a bandwidth and a frequency band that a mobile station residing in a coverage area of the base station is capable of handling, at least one of a redirected cell and a cell layer to which the mobile station associated with the mobile station capability information is to be redirected, based on the bandwidth and the frequency band in the mobile station capability information; and
a transmission unit configured to transmit redirected cell information including the determined redirected cell or cell layer to the mobile station,
wherein the redirected cell determination unit determines the at least one of the redirected cell and the cell layer by comparing the bandwidth in the mobile station capability information with respective amounts of remaining radio resources of the cells.

2. The base station as claimed in claim 1, wherein the mobile station capability information is transmitted by including information indicative of the bandwidth and the frequency band that the mobile station is capable of handling in a connection request and transmitting the information.

3. The base station as claimed in claim 1, wherein the mobile station capability information is transmitted from an upper station.

4. The base station as claimed in claim 1, wherein the redirected cell determination unit is configured to determine either the redirected cell or the cell layer to which the mobile station is to be redirected based on a bandwidth operated for each cell.

5. A mobile station, comprising:
a control plane processing unit configured to connect, in response to receipt of either a redirected cell or a cell selected from a cell layer to which the mobile station is to be redirected from a base station, to the redirected cell or the cell selected from the cell layer, based on mobile station capability information associated with the mobile station, the mobile station capability information being indicative of a bandwidth and a frequency band that the mobile station residing in a coverage area of the base station is capable of handling,
wherein the base station determines either the redirected cell or the cell layer by comparing a bandwidth in mobile station capability information associated with the mobile station with respective amounts of remaining radio resources of multiple cells.

6. The mobile station as claimed in claim 5, further comprising:
a storage unit configured to store the mobile station capability information indicative of the bandwidth and the frequency band that the mobile station is capable of handling; and
a connection request transmission unit configured to transmit a connection request by including the mobile station capability information in the connection request,
wherein the control plane processing unit is configured to connect to either the redirected cell transmitted by the base station or the cell selected from the cell layer, the redirected cell and the cell layer being determined based on the mobile station capability information transmitted by the connection request transmission unit.

7. A method of determining a redirected cell, comprising:
obtaining mobile station capability information at a base station configured to operate multiple cells each having a predefined bandwidth, the mobile station capability information being indicative of a bandwidth and a frequency band that a mobile station residing in a coverage area of the base station is capable of handling;
determining at the base station either a redirected cell or a cell layer to which the mobile station associated with the mobile station capability information is to be redirected based on the bandwidth and the frequency band in the mobile station capability information; and
transmitting either the redirected cell or the cell layer from the base station to the mobile station,
wherein determining either the redirected cell or the cell layer comprises comparing the bandwidth in the mobile station capability information with respective amounts of remaining radio resources of the cells.

* * * * *